US012706557B2

(12) United States Patent
Ikram Ul Haq et al.

(10) Patent No.: US 12,706,557 B2
(45) Date of Patent: Aug. 11, 2026

(54) METHOD OF IDENTIFYING PARAMETERS OF A MOTOR SYSTEM

(71) Applicant: ABB Schweiz AG, Baden (CH)

(72) Inventors: Omer Ikram Ul Haq, Surahammar (SE); Rahul Kanchan, Västerås (SE); Pedro Rodriguez, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 208 days.

(21) Appl. No.: 18/604,667

(22) Filed: Mar. 14, 2024

(65) Prior Publication Data

US 2024/0333187 A1 Oct. 3, 2024

(30) Foreign Application Priority Data

Mar. 29, 2023 (EP) .................................... 23164935

(51) Int. Cl.
*H02P 3/00* (2006.01)
*G01H 1/00* (2006.01)
(Continued)

(52) U.S. Cl.
CPC ............. *H02P 23/14* (2013.01); *G01H 1/003* (2013.01); *G01H 13/00* (2013.01)

(58) Field of Classification Search
CPC .......... H02P 23/14; H02P 21/05; H02P 23/04; H02P 6/10
See application file for complete search history.

(56) References Cited

U.S. PATENT DOCUMENTS

| | | | |
|---|---|---|---|
| 8,800,302 | B2 | 8/2014 | Holliday |
| 10,259,551 | B2 | 4/2019 | Veikonheimo |

(Continued)

FOREIGN PATENT DOCUMENTS

| | | | |
|---|---|---|---|
| DE | 19928015 | A1 | 12/2000 |
| DE | 102011003597 | A1 | 8/2012 |

(Continued)

OTHER PUBLICATIONS

Extended European Search Report; Application No. 23164935.1; Completed: Sep. 6, 2023; Issued: Sep. 9, 2023; 7 Pages.

(Continued)

*Primary Examiner* — Karen Masih
(74) *Attorney, Agent, or Firm* — Greenberg Traurig, LLP

(57) ABSTRACT

A method of identifying parameters of a motor system having an electric motor and a control system for vibration reduction, includes: sweeping a frequency of an oscillating reactive torque injected into the motor, determining a natural frequency of the motor system, which is the frequency at which the reactive torque produces maximum amplitude of a vibration-related parameter obtained based on measurements, incrementally increasing a magnitude of reactive torque oscillating at the natural frequency, injected to the motor, obtaining a magnitude of the parameter for each magnitude of the reactive torque, and determining, for each magnitude of the reactive torque, a gain and a phase response of the motor system, the gain being based on the magnitude of the reactive torque and the corresponding magnitude of the parameter, and the phase response being based on a phase angle of the reactive torque and a phase angle of the corresponding parameter.

10 Claims, 3 Drawing Sheets

(51) Int. Cl.
*G01H 13/00* (2006.01)
*H02P 23/14* (2006.01)

(56) References Cited

U.S. PATENT DOCUMENTS

| | | | |
|---|---|---|---|
| 10,528,027 | B2 | 1/2020 | Künzel et al. |
| 2005/0228574 | A1 | 10/2005 | Ichikawa et al. |
| 2007/0170788 | A1 | 7/2007 | Werner |
| 2013/0259252 | A1 | 10/2013 | Yasuda et al. |
| 2014/0103756 | A1 | 4/2014 | Grillenberger et al. |
| 2014/0117797 | A1 | 5/2014 | Grillenberger et al. |
| 2014/0123760 | A1 | 5/2014 | Klos et al. |
| 2017/0012487 | A1 | 1/2017 | Weiss et al. |
| 2017/0152912 | A1 | 6/2017 | Kao et al. |
| 2023/0025973 | A1 | 1/2023 | Rodriguez et al. |

FOREIGN PATENT DOCUMENTS

| | | | | |
|---|---|---|---|---|
| EP | 1191670 | A2 | 3/2002 | |
| EP | 2944560 | A1 | 11/2015 | |
| EP | 3142246 | A1 | 3/2017 | |
| JP | 2009156383 | A | 7/2009 | |
| JP | 5316424 | B2 | 10/2013 | |
| WO | 2007131889 | A1 | 11/2007 | |
| WO | WO-2009084258 | A1 * | 7/2009 | ............. H02P 23/14 |
| WO | 2014014557 | A1 | 1/2014 | |
| WO | 2015173468 | A1 | 11/2015 | |

OTHER PUBLICATIONS

Finley, William.R., et al.; "An Analytical Approach to Solving Motor Vibration Problems"; IEEE Transactions on Industry Applications; vol. 36, Issue 5; IEEE; Sep. 2000; 14 Pages.
Shimada, Arinori, et al.; "Current Compensation Signal in Suppression Control for frame vibration of PMSM by Sensorless Control"; 2007 Power Conversion Conference Nagoya; IEEE; Nagoya, Japan; Apr. 2007; 5 Pages.
Werner, Ulrich; "An analytical method to minimize dynamic foundation forces caused by transient torques in the air gap of an asynchronous machine"; 2007 International Conference on Power Engineering, Energy and Electrical Drives; IEEE; Setubal, Portugal; Apr. 12, 2007; 6 Pages.
Saarakkala, Seppo E., et al.; "Identification of Two-Mass Mechanical Systems Using Torque Excitation: Design and Experimental Evaluation"; IEEE Transactions on Industry Applications, vol. 51, Issue 5; IEEE; Sep. 2015; 10 Pages.
Werner, Ulrich; "Vibration control of large induction motors using actuators between motor feet and steel frame foundation"; ScienceDirect, Mechanical Systems and Signal Processing, vol. 112; Elsevier; Nov. 2018; 24 Pages.
Hoang, Manh-Hai, et al.; "RTC (reaction torque compensated) induction motor and its open-loop control"; JMST Advances, vol. 1; Springer Link; May 16, 2019; 8 Pages.
Kambrath, Jishnu Kavil, et al.; "Mitigation of Resonance Vibration Effects in Marine Propulsion"; IEEE Transactions on Industrial Electronics, vol. 66, No. 8; Aug. 2019; 11 Pages.
Werner, Ulrich; "Analysis of Different Vibration Control Strategies for Soft Mounted Induction Motors with Sleeve Bearings Using Active Motor Foot Mounts"; Journal of Applied Mathematics and Physics, vol. 7, No. 3; Mar. 2019; 27 Pages.
Holopainen, Timo P., et al.; "Ensuring the Low Vibration of Two-Pole Motors on Flexible Foundations: A Manufacturer-System Integrator Collaboration"; IEEE Industry Applications Magazine, vol. 26, Issue 6; IEEE; Nov. 2020; 9 Pages.
Andresen, Jan, et al.; "Compensation of the Radial and Circumferential Mode 0 Vibration of a Permanent Magnet Electric Machine based on an Experimental Characterisation"; 2020 22nd European Conference on Power Electronics and Applications (EPE'20 ECCE Europe); IEEE; Lyon, France; Sep. 7, 2020; 9 Pages.
Cao, Feng, et al.; "Active Vibration Control of a Flexible Rotor in Magnetically Suspended High-Speed Motor to Pass the First Bending Critical Speed with Optimal Phase Compensation Control"; 2019 IEEE International Electric Machines Drives Conference (IEMDC); IEEE; San Diego, CA, USA; May 12, 2019; 8 Pages.
Higuchi, Shinichi, et al.; "Reduction of Mechanical Vibration of an Induction Motor with Pulsating Torque Load by Feedforward Control Utilizing an Acceleration Sensor and a Timing Sensor"; Proceedings of 4th IEEE International. Workshop on Advanced Motion Control—AMC '96—Mie, vol. 1; IEEE; Mie, Japan; Mar. 18, 1996; 5 Pages.
Ágoston, Katalin; "Fault Detection of the Electrical Motors Based on Vibration Analysis"; Procedia Technology, vol. 19 (2015); 8th International Conference Interdisciplinarity in Engineering, Inter-Eng (2014); Science Direct, Elsevier; Tirgu Mures, Romania; Oct. 9, 2014; 7 Pages.

* cited by examiner

METHOD OF IDENTIFYING PARAMETERS OF A MOTOR SYSTEM

TECHNICAL FIELD

The present disclosure generally relates to electric motors.

BACKGROUND

Severe vibrations of the foundation of an electrical motor occur when an electrical motor operates at natural frequencies of the mechanical body, i.e., of the entire motor assembly. Traditionally, this problem has been resolved by making design modifications to the mechanical assembly to alter the natural frequency modes. This involves either design modifications to the machine itself, replacing machine bearings with higher damping factor or modifications of the mounting assembly, etc.

Another approach with electrical motors fed from a frequency converter is to use frequency skip functions which prohibits the operation of the machine at critical speeds. Still during acceleration and deceleration of motor, there are instances when machine speed passes through the natural frequency and results in large vibrations. Also, the natural frequency of the mechanical body will change over the period due to mechanical wear, tear, and bearing degradation, resulting in different unbalance to the rotating mass. The correct natural frequencies must be measured and accordingly skip frequencies must be modified. This is costly, time consuming and can cause halt in machine operation which may not be feasible in certain applications.

A better approach is to use a frequency converter to inject a compensation torque reference which is added to the torque reference generated by the frequency converter's speed controller. This additional torque generates counter forces in the air gap of the machine which leads to suppression of machine vibrations. The machine vibrations at critical frequencies are damped in both steady state as well as dynamic operating conditions of the machine. The output of PI-type or PR-type controllers is increased to a value sufficient to suppress mechanical vibrations below acceptable limits. Still, there are always small vibrations presents in the machine structure, which drive the PI-type controller to saturate, leading to dynamic stability issues. Thus, it is still not known what the optimal compensation signal should be. The use of Phase Locked Loop (PLL) in the control system is another source of instability issue while motor speed is undergoing dynamic changes. The delay caused by synchronization of the PLL leads to suboptimal operation of the vibration controller and can even lead to control instability issues.

SUMMARY

Thus, in view of the above an object of the present disclosure is to provide a method which solves or at least mitigates the problems of the prior art.

There is hence according to a first aspect of the present disclosure provided a method of identifying parameters of a motor system comprising an electric motor assembly and a control system, for vibration reduction in the electric motor assembly, the method comprising: a) sweeping a frequency of an oscillating reactive torque injected into the electric motor, b) determining a natural frequency of the motor system, the natural frequency being the frequency at which the oscillating reactive torque produces a maximum amplitude of a vibration-related parameter obtained based on vibration-related measurements by sensors mounted to the electric motor, c) incrementally increasing a magnitude of reactive torque oscillating at the natural frequency, injected to the electric motor, d) obtaining a magnitude of the vibration-related parameter for each magnitude of the reactive torque injected in step c), and e) determining, for each magnitude of the injected reactive torque, a gain and a phase response of the motor system, the gain being determined based on the magnitude of the injected reactive torque and the corresponding magnitude of the vibration-related parameter, and the phase response being determined based on a phase angle of the injected reactive torque and a phase angle of the corresponding vibration-related parameter.

By using the parameters determined by the method in an adaptive closed-loop control strategy, the gain and the phase of the injected reactive torque can be controlled adaptively during electric motor operation. Without these parameters, the information regarding the external excitation caused by vibrations at the natural frequency is lost when the counteracting vibrations are injected by the reactive torque. An accurate model of the motor system, excluding the external excitation force can be obtained based on the gain and the phase response, and the external excitations may be reconstructed from the total vibrations, i.e., the vibrations generated by external resonance excitation and resonance excited by the reactive torque, using the gain and the phase response. Based on the gain the exact amplitude of the reactive torque to be injected to essentially completely compensate for horizontal vibrations can be obtained. The phase response is used to set the phase angle of the reactive torque, instead of using a PLL.

Thus, the vibration performance of the electric motor during operation may be improved. Additionally, the operating speed range of the electric motor is increased as it can be operated at the natural frequency of the motor system. Additionally, the lifetime of the bearings of the electric motor is increased, and the structural noise as a result of vibrations is reduced. There is also no need for any mechanical modifications to reduce the vibrations.

The parameter identification process is in general a two-phase process wherein the natural frequency of vibrations of the motor system is measured in the first phase and the control parameters, gain and phase response, at that natural frequency are identified in the second phase.

According to one embodiment the oscillating reactive torque is injected at constant amplitude in step a).

According to one embodiment in step e) each gain is determined by a ratio between the magnitude of the vibration-related parameter and the magnitude of the injected reactive torque.

According to one embodiment in step e) each phase response is determined by a difference between the phase angle of the vibration-related parameter and the phase angle of the injected reactive torque.

According to one embodiment the vibration-related parameter is one of vibrational velocity, acceleration, and displacement.

According to one embodiment the sensors are accelerometers, and the vibration-related parameter is vibrational velocity, and wherein the method comprises converting the acceleration to vibrational velocity.

According to one embodiment the sensors measure horizontal acceleration.

One embodiment comprises utilising the natural frequency, the gains, and the phase responses in a control scheme to control injected reactive torque and thereby reduce vibrations in the electric motor. In particular, the injected reactive torque will counteract mechanical vibrations in the electric motor.

There is according to a second aspect of the present disclosure provided a computer program comprising computer code which when executed by a processing circuitry of a control system causes the control system to perform the steps of the method as claimed in any of the preceding claims.

There is according to a third aspect of the present disclosure provided a control system comprising: a storage medium comprising computer code, and processing circuitry configured to execute the computer code, causing the control system to perform the method of the first aspect.

The control system may comprise a variable speed drive (VSD) for main control tasks. The vibration control can be implemented on the VSD or using a separate controller.

There is according to a fourth aspect of the present disclosure provided a motor system comprising: an electric motor, and the control system of the third aspect, configured to control the electric motor.

Generally, all terms used in the claims are to be interpreted according to their ordinary meaning in the technical field, unless explicitly defined otherwise herein. All references to "a/an/the element, apparatus, component, means, etc.," are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
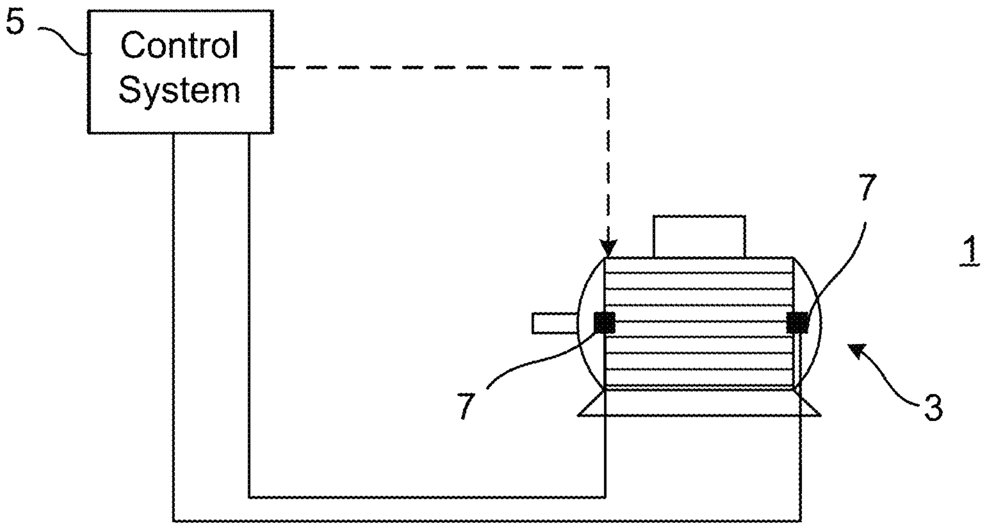
FIG. 1 schematically shows a motor system.

FIG. 1 shows an example of a motor system 1. The motor system 1 comprises a motor assembly including an electric motor 3, the foundation on which the electric motor 3 stands, and the outer cover of the electric motor 3. The motor system 1 also comprises a control system 5 configured to control the electric motor 3, and a plurality of sensors 7.

The sensors 7 are configured to make vibration-related measurements of a vibration-related parameter such as acceleration, vibrational velocity, displacement, or sound, of the motor system 1. The sensors may thus for example be accelerometers, displacement sensors, or microphones. In case of accelerometers, the sensors may for example be arranged to measure horizontal acceleration, i.e., acceleration in the horizontal plane.

Figure 2:
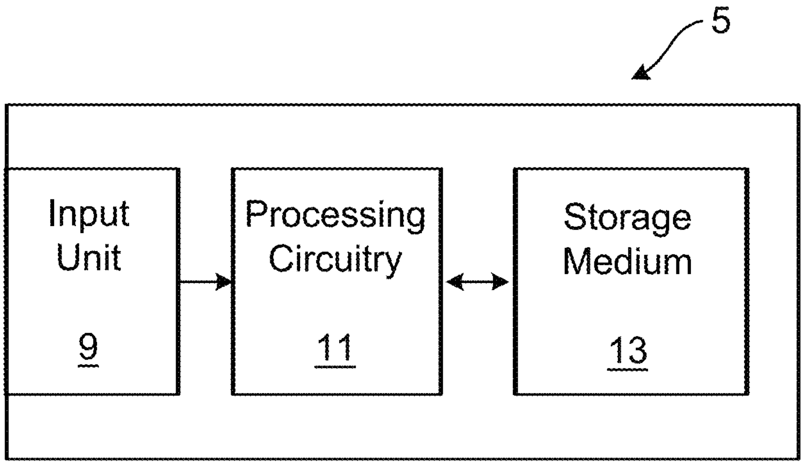
FIG. 2 schematically shows a block diagram of a control system.
Figure 3:
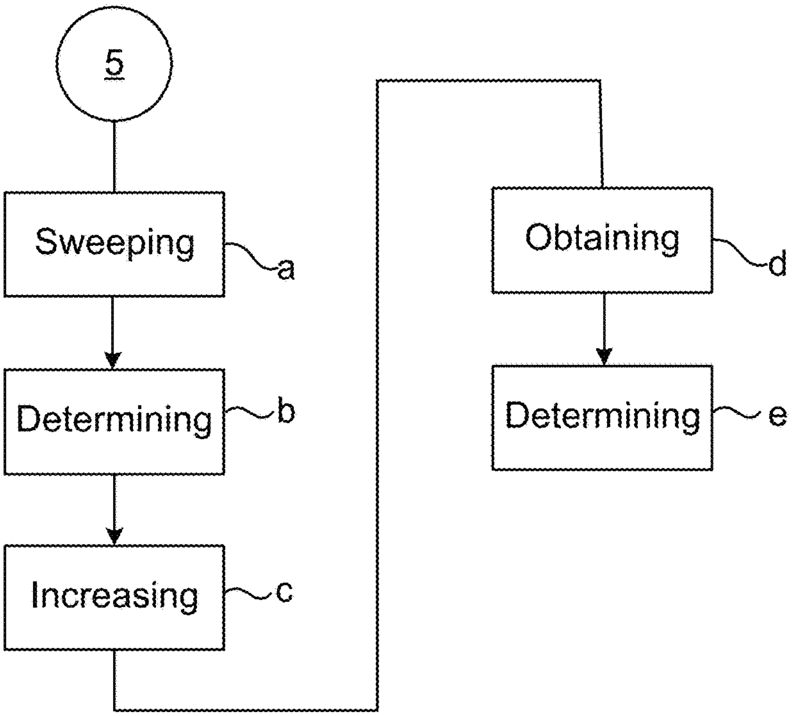
FIG. 3 is a flowchart of a method of identifying parameters of a motor system.

FIG. 2 schematically depicts a block diagram of an example of the control system 5. The control system 5 is configured to identify parameters of the motor system 1, and to control the electric motor 3 based on the parameters to reduce vibrations of the motor assembly.

The control system 5 comprises an input unit 9 configured to receive the vibration-related measurements from the sensors.

The control system 5 comprises processing circuitry 11 configured to process the vibration-related measurements.

According to one example, the control system 5 may comprise a signal conditioner which converts the vibration-related measurements from one vibration-related parameter to another. For example, the sensors may be accelerometers, and the signal conditioner may be configured to convert the acceleration to vibrational velocity. The thus obtained vibration-related parameter is then processed by the processing circuitry 11.

The control system 5 may comprise a storage medium 13. The storage medium 13 may comprise a computer program including computer code which when executed by the processing circuitry 11 causes the control system 5 to perform the methods as disclosed herein.

The processing circuitry 11 may for example use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed operations concerning identification of parameters of the motor system 1.

The storage medium 13 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

A method of identifying parameters of the motor system 1 will now be described with reference to FIGS. 3-9.

The method is generally divided into two stages; a first stage comprising steps a)-b) and a second stage comprising steps c)-e) described in the following.

Figure 4:
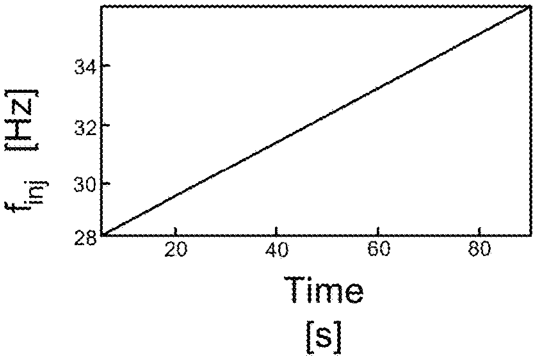
FIG. 4 shows an example of a frequency sweep of reactive torque injected to an electric motor.

In step a) a frequency of an oscillating reactive torque injected into the electric motor 11 is swept. This is illustrated in FIG. 4, which shows a frequency sweep of the reactive torque from about 28 Hz to about 36 Hz. Reactive torque is to be understood as a torque that oscillates around a value, which may be zero or offset from zero.

The swept range is selected to cover the expected natural frequency of the motor system 1.

The reactive torque reference $\tau^*_{reactive}$, on which the reactive torque injected into the electric motor 11 is based may be expressed as:

$$\tau^*_{reactive} = |\tau| \cdot \sin(2\pi f_{inj} \cdot t),$$

where $f_{inj}$ is a frequency in the range of frequencies that is being swept and $|\tau|$ is the amplitude of the reactive torque.

The reactive torque injected in step a) preferably has a constant amplitude.

Figure 5:
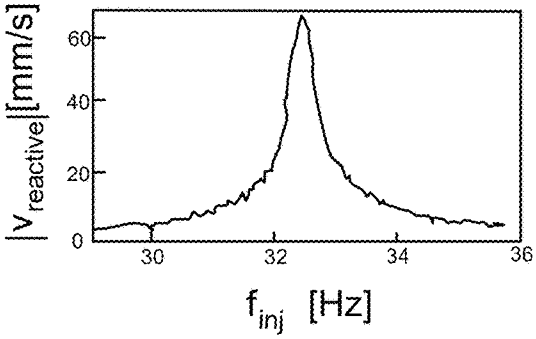
FIG. 5 shows the absolute value of reactive vibrational velocity of vibrations of the motor system resulting from the frequency sweep in FIG. 4.
Figure 6:
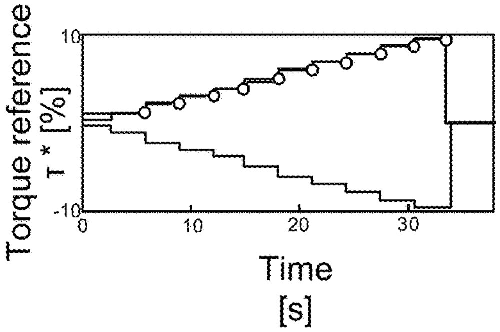
FIG. 6 shows injected reactive torque in incremental steps.

The vibration-related parameter may according to one exemplary embodiment be vibrational velocity of the motor system 1. FIG. 5 shows the absolute value, or magnitude, of the reactive vibrational velocity for the frequencies swept in step a). The reactive vibrational velocity may for example be detected as acceleration by the sensors 7, which is converted to vibrational speed by the signal conditioner. The reactive vibrational velocity $v_{reactive}$ is the velocity of the vibrations of the motor assembly generated as a result of the injected reactive torque $$\tau^*_{reactive}.$$

Generally, the total vibrational velocity of the motor system 1 is given by $v_{tot}=v_{reactive}+v_{ext}$, where $v_{ext}$ is the vibrational velocity of all vibrations other than $v_{reactive}$. If the rotor is at a standstill during step a), i.e., at zero rotational speed, the measurements by the sensors 7 results in $v_{reactive}$ because in this case $v_{ext}$ is zero. This also holds if e.g., displacement is measured by the sensors 7 instead of acceleration. Hereto, according to one example, the electric motor 3 is at standstill during step a).

The natural frequency of the motor system 1 is where the reactive vibration-related parameter, in this case vibrational velocity, attains its maximum amplitude, which is at about 32.4 Hz according to the present example.

In a step b) the natural frequency of the motor system 1 is determined by identifying the frequency of the reactive torque injected in step a), and thus of the vibration-related parameter, which generates the maximum amplitude.

Step b) ends the first stage of the method, which was to determine the natural frequency of the motor system 1. Step c) starts the second stage of the method, which is to determine the gain and phase response of the motor system 1 at the natural frequency.

In a step c) the magnitude of reactive torque oscillating at the natural frequency, injected to the electric motor 5, is incrementally increased. The incremental increase may for example be from a level of 1% of the nominal torque to a level of 10% of the nominal torque, for example in steps of 1 percentage point, i.e., 1%, 2%, 3%, . . . , 10% of the nominal torque. The values of the reactive torque, in %, is as an example shown in FIG. 6, with the data points being indicated by circles.

Figure 7:
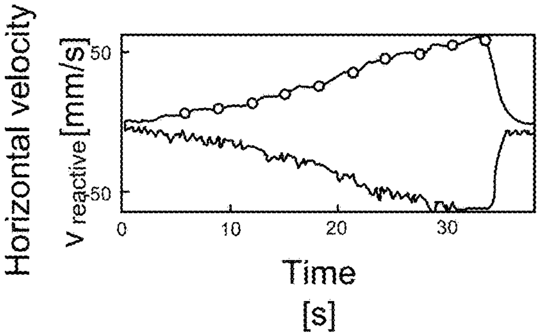
FIG. 7 shows the resultant velocity of the vibration for each incremental step in FIG. 6.

In a step d) a magnitude of the vibration-related parameter is obtained for each magnitude of the reactive torque injected in step c). The corresponding data points for the reactive vibrational velocity are shown in FIG. 7.

Steps c) and d) may be carried out at standstill of the rotor.

In a step e) for each magnitude of the injected reactive torque a gain and a phase response of the motor system 1 is determined.

Each gain is determined based on the magnitude of the injected reactive torque in step c) and the corresponding magnitude of the vibration-related parameter. In particular, each gain is determined by a ratio between the magnitude of the vibration-related parameter and the magnitude of the injected reactive torque. Thus, for example for the reactive torque injected at 1% of the nominal torque, with the vibration-related parameter being vibrational velocity, the absolute value of the total vibrational velocity, which is equal to the absolute value of the reactive vibrational velocity at standstill of the rotor, is divided with the absolute value of the reactive torque. According to the example shown in FIG. 9, the gain at 1% of the nominal torque is about 5.75.

Figure 8:
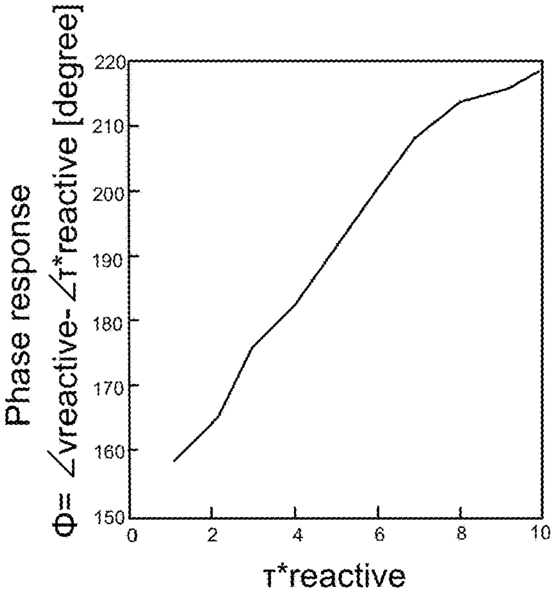
FIG. 8 shows the phase response of the motor system for each incremental step in FIG. 6.
Figure 9:
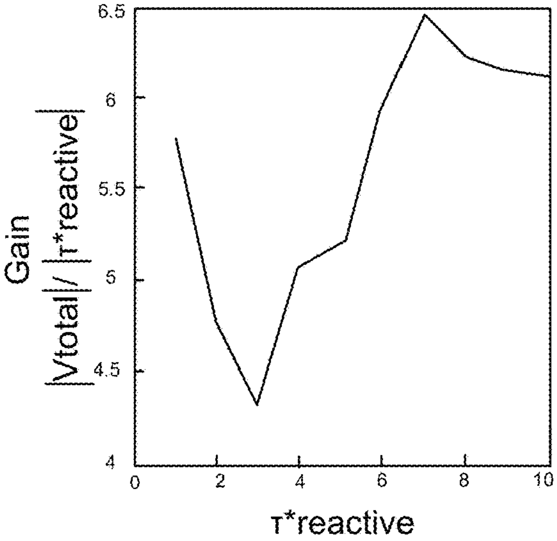
FIG. 9 shows the gain of the motor system for each incremental step in FIG. 6.

Each phase response is determined based on a phase angle of the injected reactive torque and a phase angle of the corresponding vibration-related parameter. In particular, each phase response is determined by a difference between the phase angle of the vibration-related parameter and the phase angle of the injected reactive torque. The vibration-related parameter oscillates and thus has a phase angle, while the phase angle of the injected reactive torque is known by the control system 5. For example, if the vibration-related parameter is vibrational velocity, the vibrational velocity varies over time as the motor assembly vibrates between its two extreme positions, as can be understood from the schematic illustration in FIG. 7. As shown in FIG. 8, the phase response for the reactive torque injected at 1% of the nominal torque is according to the example about 160°.

Figure 10:
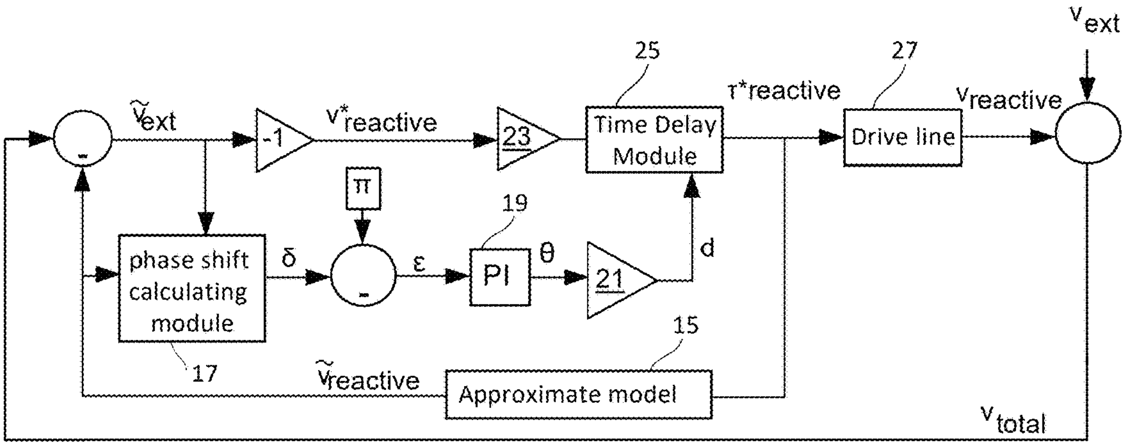
FIG. 10 shows a block diagram of a control scheme for compensating for vibrations in a motor system utilising the parameters obtained by the method of FIG. 3.

The determined gains and phase responses can be used in a control scheme to control injected reactive torque and thereby reduce vibrations in the electric motor 3. This will be described with reference to FIG. 10, which shows an exemplary control scheme for vibration reduction of the motor system 1.

A reactive torque reference $$\tau^*_{reactive}$$

in the form of a compensation torque signal is fed to an approximate model 15 of the electric motor 3 driven by the control system 5. The approximate model 15 models the gain and phase response of the motor system 1 as determined by the method described above. The approximate model is composed of multiple non-linear dynamical systems, including all relevant properties of mechanical, control, and electromagnetics of the motor system 1.

By means of the approximate model 15, an estimated reactive vibrational velocity $\tilde{v}_{reactive}$, is obtained based on the reactive torque reference $$\tau^*_{reactive}.$$

The reactive torque reference $\tau^*_{reactive}$ is also fed to a drive line 27, which represents a power converter, such as a variable frequency line, which controls the electric motor 3, the electric motor 3, and the sensors 7. This results in the generation of reactive vibrational velocity $v_{reactive}$ in the drive line 27, and a vibrational velocity $v_{ext}$ due to external excitation of the drive line 27. The total vibrational velocity $v_{tot}$ is the sum of the reactive vibrational velocity $\nabla_{reactive}$ and the vibrational velocity $v_{ext}$. The total vibrational velocity $v_{tot}$ is obtained based on measurements by the sensors 7.

The difference between the estimated reactive vibrational velocity $\tilde{v}_{reactive}$ and the total vibrational velocity $v_{tot}$, is obtained and this difference is an estimation of vibrational velocity $\tilde{v}_{ext}$ due to external excitation of the electric motor 3. The estimation of vibrational velocity $\tilde{v}_{ext}$ due to external excitation of the electric motor 3, which is a constant, is then inverted by multiplication with −1 for destructive interference. This results in a reactive vibrational velocity reference $v^*_{reactive}$. In an inverse gain multiplier module 23, the reactive vibrational velocity reference $v^*_{reactive}$ is converted to a preliminary reactive torque reference. The conversion may be obtained by multiplying the reactive vibrational velocity reference $v^*_{reactive}$ with the inverse of the gain. The phase of the preliminary reactive torque reference is then corrected by means of a time delay module 25 to obtain a new value of the reactive torque reference $$\tau^*_{reactive}.$$

The phase of the preliminary reactive torque reference may be determined as follows. A phase difference δ between the estimated reactive vibrational velocity $\tilde{v}_{reactive}$ and the estimation of vibrational velocity $v_{ext}$ due to external excitation is determined by a phase shift calculating module 17. According to the example, a difference between π and the phase difference δ, is then determined to obtain a phase error ε. The number π is the phase reference of the injected reactive torque relative to the total vibrational velocity $v_{tot}$, resulting in destructive interference. The phase error ε is fed to a PI controller 19. A phase output θ of the PI controller 19 is converted from phase to a time delay in a phase conversion module 21. This time delay is used by the time delay module 25 to obtain the new value of the reactive torque reference $$\tau^*_{reactive}.$$

The inventive concept has mainly been described above with reference to a few examples. However, as is readily appreciated by a person skilled in the art, other embodiments than the ones disclosed above are equally possible within the scope of the inventive concept, as defined by the appended claims

The invention claimed is:

1. A method of identifying parameters of a motor system comprising an electric motor assembly, and a control system, for vibration reduction in the electric motor assembly, the method comprising:

a) sweeping a frequency of an oscillating reactive torque injected into the electric motor, b) determining a natural frequency of the motor system, the natural frequency being the frequency at which the oscillating reactive torque produces a maximum amplitude of a vibration-related parameter obtained based on vibration-related measurements by sensors mounted to the electrical motor, c) incrementally increasing a magnitude of reactive torque oscillating at the natural frequency, injected to the electric motor, d) obtaining a magnitude of the vibration-related parameter for each magnitude of the reactive torque injected in step c), and e) determining, for each magnitude of the injected reactive torque, a gain, and a phase response of the motor system, the gain being determined based on the magnitude of the injected reactive torque and the corresponding magnitude of the vibration-related parameter, and the phase response being determined based on a phase angle of the injected reactive torque and a phase angle of the corresponding vibration-related parameter, and f) controlling, by the control system, injected reactive torque based on the natural frequency, the gains, and the phase responses in a control scheme to reduce vibrations in the electric motor assembly.

2. The method as claimed in claim 1, wherein the oscillating reactive torque is injected at constant amplitude in step a).

3. The method as claimed in claim 1, wherein in step e) each gain is determined by a ratio between the magnitude of the vibration-related parameter and the magnitude of the injected reactive torque.

4. The method as claimed in claim 1, wherein in step e) each phase response is determined by a difference between the phase angle of the vibration-related parameter and the phase angle of the injected reactive torque.

5. The method as claimed in claim 1, wherein the— vibration-related parameter is one of vibrational velocity, acceleration, and displacement.

6. The method as claimed in claim 5, wherein the sensors are accelerometers, and the vibration-related parameter is vibrational velocity, and wherein the method includes converting the acceleration to vibrational velocity.

7. The method as claimed in claim 1, wherein the sensors measure horizontal acceleration.

8. A non-transitory computer program comprising computer code stored on a non-transitory computer readable medium, the computer code when executed by a processing circuitry of a control system causes the control system to perform the steps of a method of identifying parameters of a motor system that includes an electric motor assembly, the method including:

a) sweeping a frequency of an oscillating reactive torque injected into the electric motor, b) determining a natural frequency of the motor system, the natural frequency being the frequency at which the oscillating reactive torque produces a maximum amplitude of a vibration-related parameter obtained based on vibration-related measurements by sensors mounted to the electrical motor, c) incrementally increasing a magnitude of reactive torque oscillating at the natural frequency, injected to the electric motor, d) obtaining a magnitude of the vibration-related parameter for each magnitude of the reactive torque injected in step c), e) determining, for each magnitude of the injected reactive torque, a gain, and a phase response of the motor system, the gain being determined based on the magnitude of the injected reactive torque and the corresponding magnitude of the vibration-related parameter, and the phase response being determined based on a phase angle of the injected reactive torque and a phase angle of the corresponding vibration-related parameter, and f) controlling, by the control system, injected reactive torque based on the natural frequency, the gains, and the phase responses in a control scheme to reduce vibrations in the electric motor assembly.

9. A control system comprising:

a storage medium including a computer code, and processing circuitry configured to execute the computer code, causing the control system to perform a method of identifying parameters of a motor system that includes an electric motor assembly, the method including:

a) sweeping a frequency of an oscillating reactive torque injected into the electric motor, b) determining a natural frequency of the motor system, the natural frequency being the frequency at which the oscillating reactive torque produces a maximum amplitude of a vibration-related parameter obtained based on vibration-related measurements by sensors mounted to the electrical motor, c) incrementally increasing a magnitude of reactive torque oscillating at the natural frequency, injected to the electric motor, d) obtaining a magnitude of the vibration-related parameter for each magnitude of the reactive torque injected in step c), e) determining, for each magnitude of the injected reactive torque, a gain, and a phase response of the motor system, the gain being determined based on the magnitude of the injected reactive torque and the corresponding magnitude of the vibration-related parameter, and the phase response being determined based on a phase angle of the injected reactive torque and a phase angle of the corresponding vibration-related parameter, and f) controlling, by the control system, injected reactive torque based on the natural frequency, the gains, and the phase responses in a control scheme to reduce vibrations in the electric motor assembly.

10. A motor system comprising:

an electric motor assembly including an electric motor, and a control system having:

a storage medium including a computer code, and processing circuitry configured to execute the computer code, causing the control system to perform a method of identifying parameters of the motor system, the method including:

a) sweeping a frequency of an oscillating reactive torque injected into the electric motor, b) determining a natural frequency of the motor system, the natural frequency being the frequency at which the oscillating reactive torque produces a maximum amplitude of a vibration-related parameter obtained based on vibration-related measurements by sensors mounted to the electrical motor, c) incrementally increasing a magnitude of reactive torque oscillating at the natural frequency, injected to the electric motor, d) obtaining a magnitude of the vibration-related parameter for each magnitude of the reactive torque injected in step c), e) determining, for each magnitude of the injected reactive torque, a gain, and a phase response of the motor system, the gain being determined based on the magnitude of the injected reactive torque and the corresponding magnitude of the vibration-related parameter, and the phase response being determined based on a phase angle of the injected reactive torque and a phase angle of the corresponding vibration-related parameter, configured to control the electric motor, and f) Controlling, by the control system, injected reactive torque based on the natural frequency, the gains, and the phase responses in a control scheme to reduce vibrations in the electric motor assembly.

* * * * *